United States Patent [19]

Heonis

[11] 3,869,555
[45] Mar. 4, 1975

[54] INSTANT BEVERAGE ARTICLE
[76] Inventor: Angelo Alexander Heonis, 460 Catherine St., Bridgeport, Conn. 06604
[22] Filed: Mar. 6, 1973
[21] Appl. No.: 338,512

[52] U.S. Cl................ 426/134, 426/171, 426/185, 426/190, 426/193
[51] Int. Cl............................................. A23l 1/00
[58] Field of Search....... 426/91, 110, 86, 134, 190, 426/193, 112, 78, 171, 185

[56] References Cited
UNITED STATES PATENTS
| | | | |
|---|---|---|---|
| 1,951,357 | 3/1934 | Hall | 426/193 |
| 2,617,324 | 11/1952 | Brody | 426/134 |
| 3,154,418 | 10/1964 | Lovell et al. | 426/78 |
| 3,275,448 | 9/1966 | Sommer | 426/78 |
| 3,312,555 | 4/1967 | Rossi et al. | 426/134 |
| 3,428,460 | 2/1969 | Ely | 426/86 |
| 3,615,671 | 10/1971 | Groesbeck et al. | 426/134 |

Primary Examiner—S. Leon Bashore
Assistant Examiner—Peter Chin
Attorney, Agent, or Firm—Arthur A. Johnson; Thomas L. Tully

[57] ABSTRACT

A dry article for the preparation of instant beverages when combined with a liquid. The article comprises a stick, a first solid, liquid-soluble mass comprising beverage base material and at least one second solid, liquid-soluble mass comrising flavoring material for said base material. The first and second masses are bonded to the stick in side-by-side relationship, the second or flavoring mass being adjacent one end of the stick so that it can be removed if the user prefers to prepare the beverage without the flavoring material. The stick serves as a handle for the dry article and as a stirrer to facilitate dissolution of the base material and the flavoring material, if present, in the liquid.

8 Claims, 3 Drawing Figures

INSTANT BEVERAGE ARTICLE

The present invention relates to the provision of convenient, stable, sanitary, dry beverage articles adapted to be packaged and dispensed in the absence of any liquid vehicle and adapted to be mixed with liquid vehicle such as hot or cold water, milk or other liquid to produce a beverage of the desired type and taste. More specifically, this invention is concerned with dry beverage articles for the preparation of instant coffee, tea, cocoa, chocolate and eggnog, such materials being referred to herein as beverage base materials. Beverages based upon such base materials may be flavored by means of sugar and/or milk (including cream), and/or other flavoring materials, and such materials are referred to herein as flavoring materials. Some users prefer the beverage with one flavoring material, such as sugar or milk, to the exclusion of the other while other users prefer the taste of the base material exclusive of any flavoring material.

It has been proposed to provide ground coffee in tablet form, including milk and sugar, for dissolution in water to produce a coffee beverage. The main disadvantage of such tablets is that they are only suitable for the preparation of coffee containing milk and sugar. The latter flavoring materials cannot be removed by the user. Also the user must handle the tablet during use and must provide a stirring means to hasten dissolution of the tablet in the water.

It has also been proposed to provide ground coffee, tea or cocoa in a dry beverage package in which the powdered base material is contained in a central capsule completely enclosed by a shell containing flavoring material such as milk and/or sugar. The package may be adhered to a handling string to facilitate removal of the capsule containing the base material, such as coffee grounds, after the beverage has been flavored thereby. Here again, the main disadvantage of such packages is the inability of the user to separate the base material from the flavoring material if the beverage is preferred without any flavoring material incorporated therein. Also the user must provide a stirring means to hasten dissolution, and must remove and dispose of the capsule before the beverage is consumed.

It is also known to provide frozen materials such as ice cream, ice milk and flavored ice on a stick, as well as lollipops and the like. While such materials can be dissolved in water, using the stick as a stirrer, to provide a beverage, such beverage only has the flavor of the base material. Furthermore the frozen materials are unstable at room temperatures, i.e., they melt and are not solid, while candy is exceptionally slow to dissolve.

Finally, it is known to provide straws which contain powdery or crystalline flavoring material therein adapted to be dissolved in water to provide a flavored beverage to be consumed through the straw. The flavoring material is uniform and particulate and no flavoring material is added to or removed therefrom to vary the taste of the beverage.

It is the principal object of the present invention to provide a dry article suitable for producing flavored or unflavored base beverages upon dissolution in water with the assistance of stirring means.

It is another object of the present invention to provide a dry, stable, convenient, sanitary, self-contained article suitable for the preparation of flavored or unflavored base beverages upon addition to water and without the necessity of providing additional flavoring materials or stirring means.

It is another object of this invention to provide a dry article suitable for producing flavored or unflavored instant base beverages upon addition to water, dissolution requiring a few minutes at most and being complete except for the functional stirring means.

These and other objects and advantages of the present invention will be apparent to those skilled in the art in the light of the present disclosure including the drawings, in which.

Figure 1:
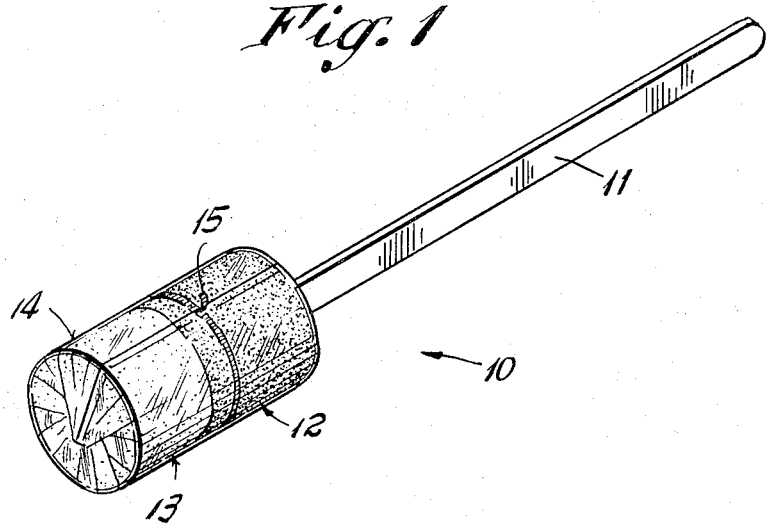
FIG. 1 is a perspective view of a packaged dry beverage article according to one embodiment of the present invention.

The objects and advantages of the present invention are accomplished by the provision of a dry, stable, convenient, sanitary, self-contained beverage article 10, as illustrated by FIG. 1 of the drawings, comprising a wooden stick 11 having bonded adjacent one end thereof a soluble, solid base mass 12 and a separate soluble, solid flavoring mass 13 which is separable from the base mass 12 and from the stick 11, and an airtight wrapper 14 provided with a tear strip 15 to facilitate sanitary removal of the wrapper 14 immediately prior to use.

Figure 2:
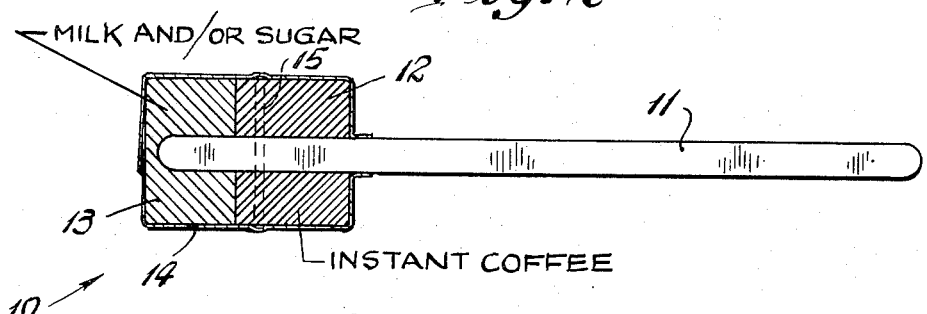
FIG. 2 is a diagrammatic cross-sectional view of the beverage article of FIG. 1.

Referring to the cross-sectional view of FIG. 2, the base mass 12 comprises instant coffee crystals or particles bonded together as a solid mass by means of a relatively taste-free, soluble, edible binder material. The flavoring mass 13 is separate from the base mass 12 so that it can be broken away from the latter, if desired, but preferably the two masses are contacting, as illustrated. Flavoring mass 13 comprises powdered milk and/or sugar held together as a solid mass by means of a soluble, edible or digestible binder material which may comprise sugar or which may be taste-free.

Thus the article of FIG. 2 is prepared for producing instant coffee by holding the stick 11 and pulling the tear strip 15 to tear and remove wrapper 14 which may comprise cellophane, saran or other plastic film. Then the user determines whether he wishes black coffee or coffee flavored by milk and/or sugar (depending upon the composition of flavoring mass 13). If black coffee is desired, the flavoring mass 13 is taken between the fingers and broken away from the base mass 12 and stick 11 by the application of slight pressure. This step is facilitated by the fact that the flavoring mass 13 is separate from the coffee mass 12 and comprises bonded particles and is porous, similar to a sugar cube, so as to be breakable (and dissolvable) much more easily than a solid, dense mass. After removal of the flavoring mass 13, the end of stick 11 carrying the coffee mass 12 is immersed in hot water and swirled gently for several seconds to cause the instant coffee to dissolve completely in the hot water to produce hot coffee in black, unsweetened condition. Dissolution is facilitated by the fact that the coffee mass 12 comprises bonded instant coffee particles or crystals and is porous like a sugar cube rather than being a dense mass.

If the user prefers flavored coffee, the flavoring mass 13 is retained on the stick 11 adjacent the coffee mass 12 and the combination is immersed in hot water and swirled to produce hot flavored coffee in the manner discussed supra.

As will be clear to those skilled in the art, the present beverage articles can be produced in such a manner to provide the flavoring mass 13 in two separately-formed adjacent half-sections, one of which contains milk and no sugar and the other of which contains sugar and no milk, or both of which contain milk and sugar. This enables the user to break off a half-section of the flavoring mass 13 if he prefers a coffee beverage containing only milk flavoring or only sugar flavoring or with one-half the usual amount of each of these materials, depending upon the composition of the flavoring mass.

The nature of the stick 11 is not critical. Wooden sticks conventionally used as coffee stirrers are well suited for use for this purpose. If desired, the end of the stick supporting the masses 12 and 13 may be provided with holes or projections such as transverse ribs to improve the bond between masses 12 and 13 and the stick to prevent the masses from slipping off the stick prior to use.

Figure 3:
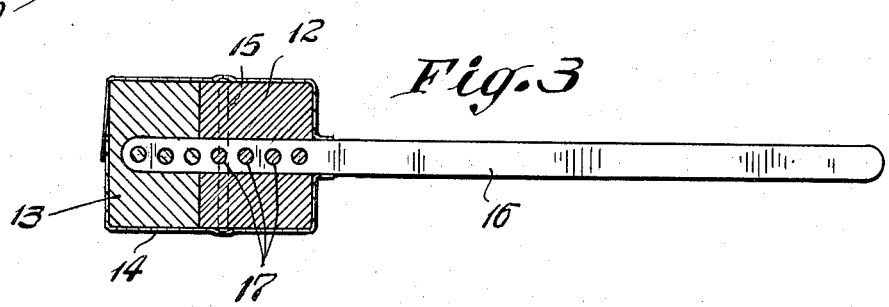
FIG. 3 is a diagrammatic cross-sectional view of a packaged dry beverage article similar to that of FIG. 2 but having a different stick means.

FIG. 3 of the drawings illustrates the use of a plastic stick 16 having holes 17 at the end supporting the flavoring mass 13 and the base mass 12 in the wrapper 14. Since the masses 12 and 13 are formed on the stick, they solidify through the holes 17 to form restraints against the slippage of the masses from the stick prior to use. However such restraints do not interfere with the intentional removal of the flavoring mass because of the relatively brittle, porous nature of the flavoring mass. The plastic stick 16 may be formed from polyethylene, polypropylene or other heat-resistant, tasteless, non-toxic plastic. The inertness of plastic represents an advantage over the use of wood sticks which tend to impart their taste to the beverage unless they are coated, such as with inert plastic.

The masses 12 and 13 may be formed on the stick in a variety of ways. In all cases the compositions of the masses are preformulated by mixing the active material, i.e. base material or sugar and/or milk, in solid, particulate form with binder material and a small amount of liquid such as water. The formulated composition is dry or semi-dry, as opposed to a solution, and has cohesive properties whereby it retains its shape when molded into a mass under slight pressure. The shape may be cylindrical, as illustrated, or cube, triangular, star-shape, or any other desirable shape.

Suitable base materials include powdered, granulated or crystalline solid materials such as instant coffee, instant tea, instant cocoa, instant eggnog and instant chocolate adapted to be dissolved quickly in hot or cold liquids such as water or milk to produce an instant beverage.

Suitable flavoring materials will vary depending upon the nature of the base material. The most common solid flavoring materials are powdered milk (including cream) and powdered or granulated sucrose. Other solid flavorings include crystalline lemon flavor for tea and granulated malt flavor.

Suitable binder materials include sugar such as granulated sucrose, the needle crystalline sugars such as glucose and fructose, gum arabic, gum tragacanth, cornstarch, polyvinyl alcohol, casein, albumin, glycerine and a variety of similar binder materials which preferably are at least partially soluble in water and digestible and which, per se, or in combination with a small amount of water, are highly cohesive. The amount of binder material used in combination with the base material, such as instant coffee, or with the flavoring material, such as powdered milk, is that minor amount which is found sufficient to form a form-retaining mass. The suitable amount will vary depending upon the identity of the binder and the nature of the active material being bound, but generally an amount of binder material as low as from about 1% by weight of the total mass will be sufficient. In cases where sugar is used as both flavoring material and binder material, the upper limit on the amount of sugar is determined by the degree of sweetness desired and may range as high as 100% by weight of the flavoring mass if no milk is present therein. In cases where no sugar is desired, one of the other sugar-free binders will be used and in minor amounts of from about 1% up to about 15% or more based upon the weight of the total mass.

The following specific example illustrates the production of an instant coffee stick according to one embodiment of the present invention.

A composition suitable for forming a coffee base mass is produced by adding 1 part by weight of granulated sugar to a bowl, which has been wetted and turned over to drain, mixing the sugar and residual water, adding 2 parts by weight of freeze-dried instant coffee particles and mixing to fluff and form a uniform base composition.

A composition suitable for forming a milk and sugar flavoring mass is produced by adding 1 part by weight of granulated sugar to a bowl, which has been wetted and turned over to drain, mixing the sugar and residual water, adding 2 parts by weight of powdered cream and mixing to fluff and form a uniform flavoring composition.

Both compositions are substantially dry and particulate but cohesive under the effects of even slight pressure. A cylindrical 1 inch diameter Teflon mold may be used having a slotted cover at one end to receive a stick such as 11 and a slotted Teflon piston at the other end which is slidable within the cylinder and has a central slot adapted to receive and slide over the stick. The stick 11 can be inserted centered though the slotted cover a distance of about one and one-quarter inches. Next the dry coffee base composition can be introduced into the cylinder and the piston introduced to compress the coffee base down and over and around the stick to form a cohered coffee mass having a height of about three-quarters of an inch, the stick protruding from the coffee mass by about ½ inch. The pressure applied by the piston could be rather small and may be hand-applied so as to avoid compressing the coffee mass to a dense mass having no porosity and having slow solubility.

Next the piston is withdrawn and a similar amount of the dry flavoring composition can be introduced into the cylinder and compressed over the stick and against the coffee mass using similar pressure to form a cohered flavoring mass having a height of about three-quarters of an inch adhered to the end of the stick adjacent the coffee mass.

After withdrawal of the piston, a cylindrical plastic film wrapper may be placed over the open end of the cylinder and the formed coffee stick can be pushed out of the cylinder and into the plastic wrapper by pushing the stick into the slotted cover to force the other end of the stick carrying the flavoring mass and coffee mass out of the open end of the cylinder and into the wrapper. Finally, the wrapper can be sealed around the stick to produce a packaged coffee stick as shown by FIG. 1 of the drawings.

As mentioned hereinbefore, the flavoring mass can be produced in two steps, if desired, to produce half-sections which can be sharply broken away from each other to provide a coffee stick having a half portion of milk and sugar. Also two different flavoring masses can be formed on the stick, the one adjacent the coffee mass containing milk and the outermost mass containing sugar so that the user can break away the sugar mass to provide a coffee stick having milk and no sugar.

Variations and modifications may be made within the scope of the claims and portions of the improvements may be used without others.

I claim:

1. An instant beverage article suitable for the preparation of a liquid beverage upon addition to a liquid, comprising a stick having bonded adjacent one end thereof a quickly dissolvable solid base mass comprising a water-soluble particulate base material selected from the group consisting of coffee, tea, cocoa, eggnog and chocolate and a minor amount by weight of a water-soluble, digestible binder material and having bonded to said stick adjacent said base mass at least one solid flavoring mass comprising a water-soluble flavoring material selected from the group consisting of sweetening agents and milk and mixtures thereof and a water-soluble, digestible binder material, said flavoring mass being manually removable from said stick by taking said mass between the fingers and removing it as a solid mass by the application of slight pressure while said base mass is retained on said stick, if desired, to provide an article suitable for the preparation of base beverage free of the flavoring material, and said stick functioning as a stirrer to assist the dissolving of said base mass in said liquid.

2. An article according to claim 1 in which said base material comprises instant coffee.

3. An article according to claim 1 in which said flavoring mass comprises powdered milk and sugar.

4. An article according to claim 1 in which two flavoring masses are present bonded to said stick, one comprising powdered milk and the other comprising sugar.

5. An article according to claim 1 in which said base mass and said flavoring mass are positioned adjacent each other on said stick in a contacting relationship.

6. An article according to claim 1 in which said stick is provided with means which improve the bonding of at least said base mass to said stick.

7. An article according to claim 6 in which said stick is plastic.

8. An article according to claim 1 in which granulated sucrose is used both as the binder material and as the flavoring material.

* * * * *